United States Patent [19]

Kavesh et al.

[11] Patent Number: 5,006,390

[45] Date of Patent: Apr. 9, 1991

[54] RIGID POLYETHYLENE REINFORCED COMPOSITES HAVING IMPROVED SHORT BEAM SHEAR STRENGTH

[75] Inventors: Sheldon Kavesh, Whippany, N.J.; Kwang Kim, Seoul, Rep. of Korea; Young D. Kwon; Dusan C. Prevorsek, both of Morristown, N.J.

[73] Assignee: Allied-Signal, Morris Township, Morris County, N.J.

[21] Appl. No.: 367,642

[22] Filed: Jun. 19, 1989

[51] Int. Cl.$^5$ .................... B32B 5/08,12; B32B 27/02

[52] U.S. Cl. .................... 428/105; 428/113; 428/114; 428/175; 428/294; 428/295; 428/298; 428/372

[58] Field of Search ............ 526/348.1; 428/113, 428/114, 265, 290, 294, 105, 175, 298, 372, 295

[56] References Cited

U.S. PATENT DOCUMENTS

| | | |
|---|---|---|
| 4,137,394 | 1/1979 | Meihuizen et al. . |
| 4,181,768 | 1/1980 | Severin ........................ 428/252 |
| 4,344,908 | 8/1982 | Smith et al. . |
| 4,356,138 | 10/1982 | Kavesh et al. ................ 264/164 |
| 4,403,012 | 9/1983 | Harpell et al. ................ 428/290 |
| 4,455,273 | 6/1984 | Harpell et al. . |
| 4,543,286 | 9/1985 | Harpell et al. . |
| 4,623,574 | 11/1986 | Harpell et al. ................ 428/113 |
| 4,748,064 | 5/1988 | Harpell et al. ................ 428/113 |
| 4,769,433 | 9/1988 | Chanzy et al. ................ 526/348.1 |
| 4,820,568 | 4/1989 | Harpell et al. ................ 428/113 |

FOREIGN PATENT DOCUMENTS

| | | |
|---|---|---|
| 0144997 | 6/1985 | European Pat. Off. . |
| 0198565 | 10/1986 | European Pat. Off. . |
| 0311197 | 4/1989 | European Pat. Off. . |
| 0311198 | 4/1989 | European Pat. Off. . |

OTHER PUBLICATIONS

D. F. Adams et al., "Properties of a Polymer-Matrix Composite Incorporating Allied A-900 Polyethylene Fiber", Sampe J. Sept./Oct., 1985, pp. 44–48.

*Primary Examiner*—Joseph L. Schofer
*Assistant Examiner*—Tom Weber
*Attorney, Agent, or Firm*—R. C. Stewart, II; G. H. Fuchs; D. L. Webster

[57] ABSTRACT

The present invention relates to high strength, high modulus polyethylene filaments which form composites having improved shear strength and composites formed from said filaments.

34 Claims, 2 Drawing Sheets

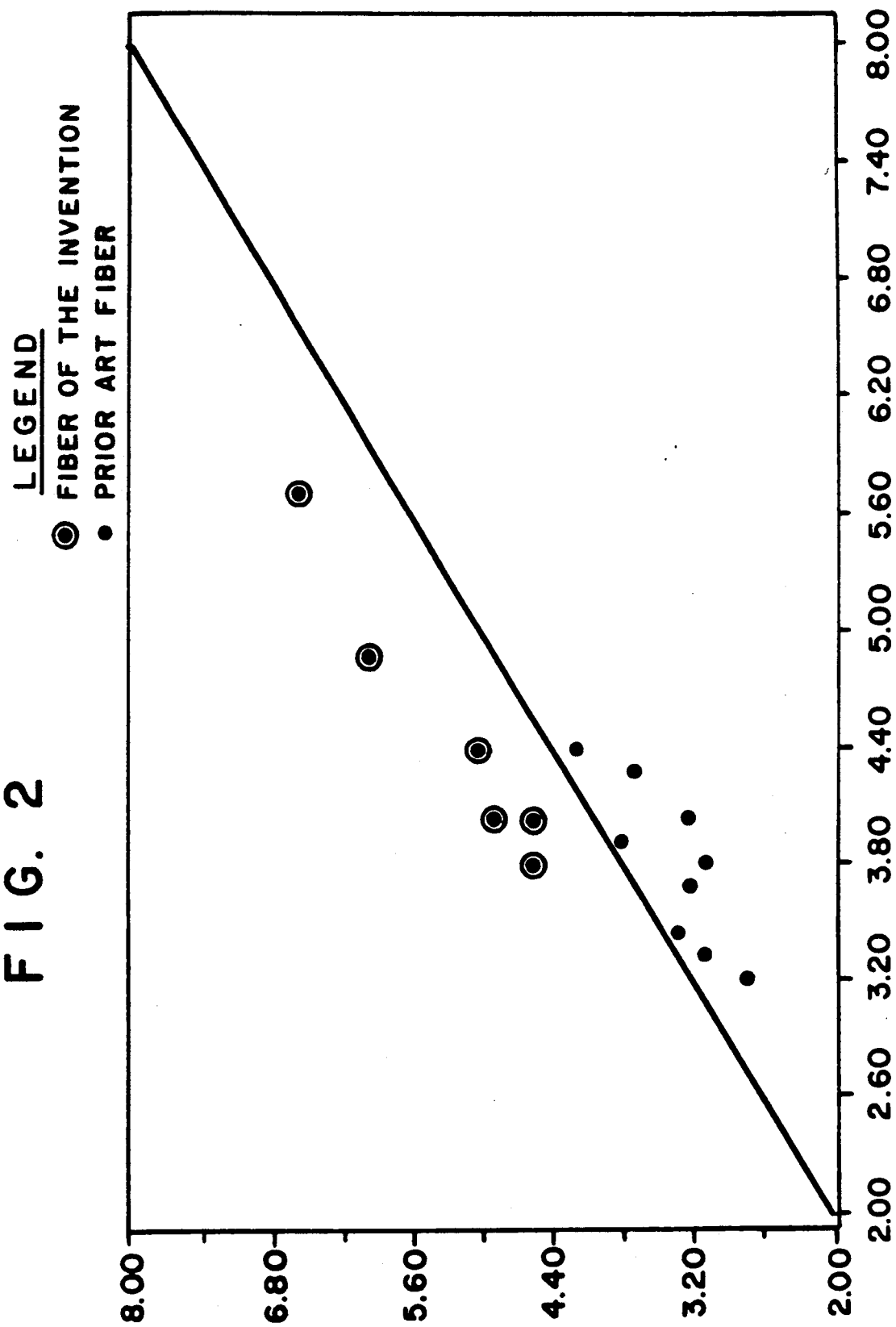

RIGID POLYETHYLENE REINFORCED COMPOSITES HAVING IMPROVED SHORT BEAM SHEAR STRENGTH

BACKGROUND OF THE INVENTION

The invention relates to rigid composite articles reinforced with high tenacity, high modulus polyethylene fibers. More particularly, this invention relates to such articles having improved short beam shear strength.

PRIOR ART

Fiber reinforced composites are well known in the prior art. Such composites are composed of a fiber or reinforcing phase and a matrix phase. Many fiber and matrix materials are available and a great number and variety of composite compositions may be and have been prepared. Among the fibers available for composite construction are: glass, carbon, aramid and more recently, high tenacity, high modulus polyethylene. For example, polyethylene fibers and yarns of high tenacity exceeding 20 g/d and modulus exceeding 500 g/d have been described for example in Methuzen et al. U.S. Pat. No. 4,137,394, Kavesh et al. U.S. Pat. No. 4,356,138, and Smith et al. U.S. Pat. No. 4,344,908.

The matrix material employed may vary widely and may be a metallic material, a semi-metallic material, an organic material and/or an inorganic material. The matrix material may be flexible (low modulus) or rigid (high modulus). Among the useful high modulus or rigid matrix materials are thermoplastic resins such as polycarbonates, polyphenylenesulfides, polyphenylene oxides, polyester carbonates, polyesterimides, and polyimides; and thermosetting resins such as epoxy resins, phenolic resins, modified phenolic resins, allylic resins, alkyd resins, unsaturated polyesters, aromatic vinylesters as for example the condensation produced of bisphenol A and methacrylic acid diluted in a vinyl aromatic monomer (e.g. styrene or vinyl toluene), urethane resins and amino (melamine and urea) resins. The major criterion is that the matrix material holds the filaments together, and maintains the geometrical integrity of the composite under the desired use conditions.

In particular, composites containing high strength, high modulus polyethylene fibers in combination with rigid matrices such as epoxy resins have been described in Harpell et al. U.S. Pat. Nos. 4,403,012, 4,455,273, 4,543,286 and 4,623,574, and in an article entitled "Properties of a Polymer-matrix Composite Incorporating ALL160 A-900 Polyethylene Fiber" by D.F Adams et al. Sampe J., Sept/Oct, pp. 44-48, (1985). However, all such known composites containing high strength, high modulus polyethylene fibers in combination with rigid matrices have exhibited low shear properties. For example, in the aforementioned article by D.F. Adams et al., the authors state that ". . . shear properties are somewhat low". The significance of this observation is that for particular applications, e.g., aircraft structural composites, shear strength specifications are vitally important to the utility of the composite.

BRIEF DESCRIPTION OF THE DRAWINGS

The invention will be more fully understood and further advantages will become apparent when reference is made to the following detailed description of the invention and the accompanying drawings in which:

FIG. 2 is a plot of experimentally obtained short beam shear strength values vs. short beam shear strength values calculated from the regression analysis.

SUMMARY OF THE INVENTION

Figure 1:
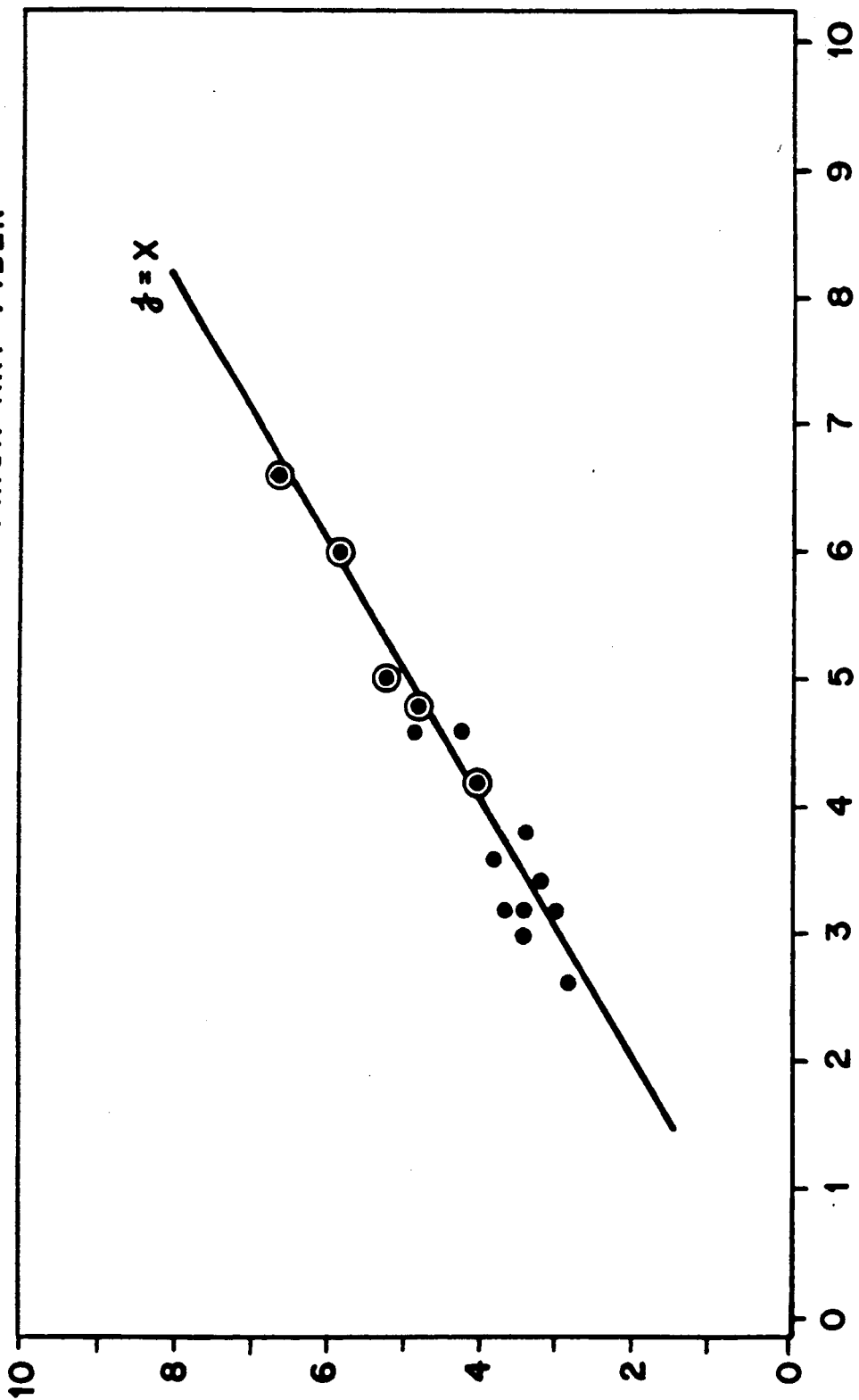
FIG. 1 is a plot of experimentally obtained short beam shear strength values versus calculated short beam shear strength values.

The present invention relates to high strength, high modulus polyethylene filaments which form composites having improved shear strength, said filaments having a tenacity of at least about 20 grams/denier, a tensile modulus of at least about 500 grams/denier, an energy-to-break of at least about 30 joules/gram, a weight average filament diameter equal to or less than about 30 micrometers and an average filament aspect ratio equal to or less than about 2.9:1. As used herein, the "weight average filament diameter", "D" is determined as follows:

$$D = 12.01 \sqrt{\text{Denier/Fil}}, \text{ micrometers}$$

where "denier" is the total yarn denier and "Fil" is the number of filaments in the yarn.

To determine the average filament aspect ratio, a scanning electron micrograph is taken of the cross-section of the yarn. The picture is mounted on the stage of an epidiascope of a Leitz T.A.S. image analyzer. The image analyzer determines for each filament the lengths of the longest and shortest chords through the centroid of the filament cross-section. The aspect ratio for a particular filament is the ratio of these dimensions. The average filament aspect ratio for the yarn is the arithmetic average of the aspect ratios of the individual filaments.

Another aspect of this invention relates to composites fabricated from the fibers of this invention. These composites comprise a network of the high strength polyethylene fibers of this invention in a matrix material.

Surprisingly, the composites of this invention exhibit improved short beam shear strength compared to the short beam shear strength of composites incorporating filaments of larger weight average diameters or larger average filament aspect ratio where all other physical characteristics such as fiber volume fractions, fiber, matrix material and the like are the same. As used herein the "short beam shear strength" of a composite is the apparent interlaminar shear strength of a parallel fiber reinforced composite and is determined by the short beam method as described in A.S.T.M. Standard Test Method D 2344-76.

DETAILED DESCRIPTION OF THE INVENTION

One aspect of this invention relates to high strength, high modulus polyethylene filaments having a tenacity of at least about 20 grams/denier, a tensile modulus of at least about 500 grams/denier, an energy-to-break of at least about 30 joules/gram, said filaments having a weight average filament diameter equal to or less than about 30 micrometers, and an average filament aspect ratio equal to or less than about 2.9:1. As used herein, the term "polyethylene" shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these filaments. Many of the filaments have melting points higher than the melting point of the polymer from which they were formed. Thus, for example, high molecular weight polyethylenes of 150,000, one million and two million generally have melting points in the bulk of 138° C. The highly oriented polyethylene filaments made of these materials have melting points of from about 7 to about 13° C. higher. Thus, a slight increase in melting point reflects the crystalline perfection and higher crystalline orientation of the filaments as compared to the bulk polymer. Surprisingly, we have discovered that the weight average diameter and the average aspect ratio of polyethylene filaments has an effect on the short beam shear strength of composites formed from the filaments. In the preferred embodiments of the invention, the weight average diameter of the filaments is from about 20 to about 30 micrometers, and the average aspect ratio of the filaments is from about 2.5:1 to about 2.9:1. In the particularly preferred embodiments of the invention, the weight average diameter of the filaments is from about 15 to about 20 micrometers, and the average aspect ratio of the filaments is from about 2:1 to about 2.5:1. In the most preferred embodiments of the invention the weight average diameter of the filaments is from about 5 to about 15 micrometers, and the average aspect ratio of the filaments is from about 1:1 to about 2:1.

Preferred polyethylene filaments for use in the practice of this invention are those having a tenacity equal to or greater than about 20 g/d, a tensile modulus equal to or greater than about 500 g/d, an energy-to-break equal to or greater than about 20 joules/grams and a molecular weight equal to or greater than about 150,000. Particularly preferred filaments are those having a tenacity equal to or greater than about 25 g/d, a tensile modulus equal to or greater than about 1000 g/d, energy-to-break equal to or greater than about 30 joules/grams and a molecular weight equal to or greater than about 500,000. Amongst these particularly preferred embodiments, most preferred are those embodiments in which the tenacity of the filaments are equal to or greater than about 30 g/d, the tensile modulus is equal to or greater than about 1200 g/d, the energy-to-break is equal to or greater than about 40 joules/gram and a molecular weight equal to or greater than about 1,000,000. In the practice of this invention, filaments of choice have a tenacity equal to or greater than about 30 g/d, the tensile modulus is equal to or greater than about 1200 g/d, the energy-to-break is equal to or greater than about 40 joules/gram and a molecular weight of from about 1,000,000 to about 5,000,000.

High strength, high modulus polyethylene filaments for use in the practice of this invention may be formed using conventional procedures. For example, such filaments may be grown in solution as described in Meihuzen et al. U.S. Pat. No. 4,137,394, or Kavesh et al. U.S. Pat. No. 4,356,138 issued Oct. 26, 1982, or a filament spun from a solution to form a gel structure, as described in German Off. 3,004,699 and GB 2051667, and especially as described in application Ser. No. 572,607 of Kavesh et al. filed Jan. 20, 1984 now U.S. Pat. No. 4,551,296 (see EPA 64,167 published Nov. 10, 1982).

Another aspect of this invention relates to a composite comprising a network of the polyethylene filaments of this invention in a matrix. In the composite articles of our invention, the filaments may be arranged in networks having various configurations. For example, a plurality of filaments can be grouped together to form twisted or untwisted yarn bundles in various alignment. In preferred embodiments of the invention, the filaments in each layer are aligned substantially parallel and unidirectionally such that the matrix material substantially coats the individual filaments. The filaments or yarn may be formed as a felt, knitted or woven (plain, basket, sating and crow feet weaves, etc.) into a network, fabricated into non-woven fabric, arranged in parallel array, layered, or formed into a fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M.R. Silvouist et al., J. Macromol Sci. Chem., A7(1), pp. 203 et. seq. (1973) are particularly suitable.

The matrix material employed in the conduct of this invention may vary widely and may be a metallic material, a semi-metallic material, an organic material and/or an inorganic material that having a modulus equal to or greater than about 50,000 psi (0.39 mPa). Illustrative of useful matrix materials are thermoplastic resins such as polycarbonates, polyarylene sulfides, polyarylene oxides, polyester carbonates, polyesterimides and polyimides; and thermosetting resins such as epoxy resins, phenolic resins, modified phenolic resins, allylic resins, alkyd resins, unsaturated polyester, aromatic vinylester, urethane resins and amino resins.

In the preferred embodiments of the invention the matrix material is a rigid (high modulus) polymeric material having a tensile modulus measured at about 23° C. equal to or greater than about 50,000 psi (344.7 MPa). Preferably the tensile modulus of the rigid matrix material is greater than 100,000 psi (689 4 MPa), more preferably is greater than 200,000 psi (1378.8 MPa) and most preferably is greater than about 300,000 psi (2068.2 MPa).

The composite of this invention can be fabricated using a number of procedures. In general, the layers are formed by molding the combination of the matrix material and filaments in the desired configurations and amounts by subjecting them to heat and pressure.

The filaments may be premolded by subjecting them to heat and pressure. For polyethylene filaments, molding temperatures range from about 20° to about 150° C., preferably from about 80° to about 145° C., more preferably from about 100° to about 135° C., and more preferably from about 110° to about 130° C. The pressure may range from about 10 psi (69 kPa) to about 10,000 psi (69,000 kPa). A pressure between about 10 psi (69 kPa) and about 100 psi (690 kPa), when combined with temperatures below about 100° C. for a period of time less than about 1.0 min, may be used simply to cause adjacent filaments to stick together. Pressures from about 100 psi to about 10,000 psi (69,000 kPa), when coupled with temperatures in the range of about 100° to about 155° C. for a time of between about 1 to about 5 min, may cause the filaments to deform and to compress together (generally in a film-like shape). Pressures from about 100 psi (690 kPa) to about 10,000 psi (69,000 kPa), when coupled with temperatures in the range of about 150° to about 155° C. for a time of between 1 to about 5 min, may cause the film to become translucent or transparent.

The filaments and networks produced therefrom are formed into "simple composites" as the precursor to preparing the complex composite articles of the present invention. The term, "simple composites", as used herein is intended to mean composites made up of one or more layers, each of the layers containing filaments as described above with a single major matrix material, which material may include minor proportions of other materials such as fillers, lubricants, or the like as noted heretofore.

The proportion of rigid matrix material to filament is variable for the simple composites, with matrix material amounts of from about 5% to about 150 Vol. %, by volume of the filament, representing the broad general range. Within this range, it is preferred to use composites having a relatively high filament content such as composites having only about 10 to about 50 Vol. % matrix material, by volume of the composite, and more preferably from about 10 to about 30 Vol. % matrix material by volume of the composite.

Stated another way, the filament network occupies different proportions of the total volume of the simple composite. Preferably, however, the filament network comprises at least about 30 volume percent of the simple composite. For ballistic protection, the filament network comprises at least about 50 volume percent, more preferably about 70 volume percent, and most preferably at least about 75 volume percent, with the matrix occupying the remaining volume.

A particularly effective technique for preparing a preferred composite of this invention comprised of substantially parallel, unidirectionally aligned filaments includes the steps of pulling a filament or bundles of filaments through a bath containing a solution of a matrix material, and circumferentially winding this filament into a single sheet-like layer around and along a bundle of filaments the length of a suitable form, such as a cylinder. The solvent is then evaporated leaving a sheet-like layer of filaments embedded in a matrix that can be removed from the cylindrical form. Alternatively, a plurality of filaments or bundles of filaments can be simultaneously pulled through the bath containing a solution or dispersion of matrix material and laid down in closely positioned, substantially parallel relation to one another on a suitable surface. Evaporation of the solvent leaves a sheet-like layer comprised of filaments which are coated with the matrix material and which are substantially parallel and aligned along a common filament direction. The sheet is suitable for subsequent processing such as laminating to another sheet to form composites containing more than one layer.

Similarly, a yarn-type simple composite can be produced by pulling a group of filament bundles through a dispersion or solution of the matrix material to substantially coat each of the individual filaments, and then evaporating the solvent to form the coated yarn. The yarn can then, for example, be employed to form fabrics, which in turn, can be used to form more complex composite structures. Moreover, the coated yarn can also be processed into a simple composite by employing conventional filament winding techniques; for example, the simple composite can have coated yarn formed into overlapping filament layers.

The number of layers included in the composite of this invention may vary widely depending on the uses of the composite, for example, in those uses where the composite would be used as ballistic protection, the number of layers would depend on a number of factors including the degree of ballistic protection desired and other factors known to those of skill in the ballistic protection art. In general for this application, the greater the degree of protection desired the greater the number of layers included in the article for a given weight of the article. Conversely, the lessor the degree of ballistic protection required, the lessor the number of layers required for a given weight of the article. It is convenient to characterize the geometries of such composites by the geometries of the filaments and then to indicate that the matrix material may occupy part or all of the void space left by the network of filaments. One such suitable arrangement is a plurality of layers or laminates in which the coated filaments are arranged in a sheet-like array and aligned parallel to one another along a common filament direction. Successive layers of such coated unidirectional filaments can be rotated with respect to the previous layer. An example of such laminate structures are composites with the second, third, fourth and fifth layers rotated +45°, −45°, 90° and 0°, with respect to the first layer, but not necessarily in that order. Other examples include composites with 0°/90° layout of yarn or filaments.

One technique for forming composites of this invention having more than one layer includes the steps of arranging coated filaments into a desired network structure, and then consolidating and heat setting the overall structure to cause the coating material to flow and occupy the remaining void spaces, thus producing a continuous matrice. Another technique is to arrange layers or other structures of coated or uncoated filament adjacent to and between various forms, e.g. films, of the matrix material and then to consolidate and heat set the overall structure. In the above cases, it is possible that the matrix can be caused to stick or flow without completely melting. In general, if the matrix material is caused to melt, relatively little pressure is required to form the composite; while if the matrix material is only heated to a sticking point, generally more pressure is required. Also, the pressure and time to set the composite and to achieve optimal properties will generally depend on the nature of the matrix material (chemical composition as well as molecular weight) and processing temperature.

The composites of this invention comprising one or more layers may be incorporated into complex composites. For example, such composites may be incorporated into more complex composites to provide a rigid complex composite article suitable, for example, as structural ballistic-resistant components, such as helmets, structural members of aircraft, and vehicle panels.

For example, a particularly useful ballistic-resistant complex composite comprises a simple composite comprising high strength filaments in a low modulus elastomeric matrix on which is formed at least one layer comprising highly-orientated ultra high molecular weight polyethylene filament in a rigid matrix, such as an epoxy resin. Other useful complex ballistic resistant composites comprises one or more layers comprising highly-oriented ultra high molecular weight polyethylene filaments of this invention in a rigid matrix such as an epoxy resin and one or more layers formed from an impact resistant material such as steel plates, titanium plates, composite armor plates, ceramic reinforced metallic composites, ceramic plates and high strength filament composites such as S-glass, E-glass or aramifilaments in a high modulus resin matrix. A most preferred embodiment of the invention is a complex composite having one or more layers formed from a network comprising the filaments of this invention in a rigid matrix, and one or more rigid impact resistant layers which will at least partially deform the initial impact surface of the projectile or cause the projectile to shatter such as layers formed from a ceramic material as for example aluminum oxide, boron carbide, silicon carbide and titanium borides.

The composites of this invention exhibit improved short beam shear strength as compared to analogous composites formed from filaments of larger diameter and/or larger aspect ratio. In the preferred embodiments of the invention, the short beam shear strength of the composites are equal or greater than that given by the following relationship:

$$SBSS(KSI) = 7.32 - 10.73\ V_f + 6.99\ V_f^2 + K_t$$

wherein:
SBSS is the short beam shear strength in KSI units;
$V_f$ is the fiber volume fraction in the composite; and
$K_t$ is a factor related to the surface treatment of the yarn where $K_t$ is equal to about 0 when the surface of the yarn is subjected to corona discharge treatment, and $K_t$ is equal to 0.47 when the surface of the yarn is subjected to plasma treatment.

The composites of this invention are useful in the fabrication of many useful articles such as ballistic armor and helmets, or structural composites.

The following examples are presented to provide a more complete understanding of the invention. The specific techniques, condition, materials, proportions and reported data set forth to illustrate the principles of the invention are exemplary and should not be construed as limiting the scope of the invention.

EXAMPLES 1 TO 15

(A) Yarn Preparation, Yarns A-F

High strength, high modulus polyethylene yarns were prepared from 22.7 IV (3.2×10⁶ weight average molecular weight) polymer in accordance with the procedures in U.S. Pat. No. 4,413,110 and Ser. No. 895,396 filed 8/11/86. All yarns were of 118 filaments. Prior art yarns A & B were of weight average filament diameter larger than 30 Mm and/or average filament aspect ratio greater than about 2.9:1. Yarns C-F of this invention were of weight average filament diameter less than 30 Mm and of average filament aspect ratio less than 2.9:1.

The weight average filament diameters, the average filament aspect ratios and the yarn tensile properties are set forth in the following Table I.

TABLE I

POLYETHYLENE YARN AND FILAMENT PROPERTIES

| Yarn | Yarn Denier | Wt. Avg. Filament Diam., Mm | Avg. Filament Aspect Ratio | Tenacity g/d | Modulus g/d |
|---|---|---|---|---|---|
| I. Prior Art Yarns | | | | | |
| A | 1121 | 37.0 | 3.0 | 33 | 1420 |
| B | 1223 | 38.7 | 2.5 | 30 | 1231 |

TABLE I-continued

POLYETHYLENE YARN AND FILAMENT PROPERTIES

| Yarn | Yarn Denier | Wt. Avg. Filament Diam., Mm | Avg. Filament Aspect Ratio | Tenacity g/d | Modulus g/d |
|---|---|---|---|---|---|
| II. Yarns of This Invention | | | | | |
| C | 326 | 20.0 | 2.7 | 33 | 1609 |
| D | 295 | 19.0 | 2.4 | 34 | 1594 |
| E | 294 | 19.0 | 2.2 | 33 | 1684 |
| F | 295 | 19.0 | 2.2 | 32 | 1466 |

The yarns of this invention may be distinguished from prior art yarns by their combination of low filament diameter and high filament cylindricity. The yarns of the invention are of weight average filament diameter less than about 30 Mm and average filament aspect ratio less than about 2.9:1, while the weight average filament diameter of the prior art yarns was greater than about 35 Mm and the average filament aspect ratio of these yarns was greater than about 3.0:1.

(B) Surface Treatment

Yarns A-F prepared for composite manufacture by corona or plasma treatment. Corona treatment was carried out using a commercial corona treatment unit model No. CMD-200-MM-PN-EX manufactured by Softal Co. This machine operates at a constant DC voltage of 5000 volts and variable current. Treatment level also depends on treatment speed. In the following examples, all yarns which were corona treated were run at 10 ft/min (3.05 m/min) using 0.8 amp treatment current. Treatment level was 100 watts/ft²/min. (9.29 m²/min).

Plasma treatment was carried out using a system 8060 commercial unit manufactured by Branson/IPC. The conditions under which the yarns were plasma treated were:
Atmosphere: $O_2$
Pressure: 0.5 torr (66.5 Pa)
Power: 75 watt
Yarn residence time: 30 sec

(C) Composite Manufacture and Testing

Short beam shear test specimens were prepared of 0.40"-0.50" (1.02 cm-1.27 cm) width, 1" (2.54 cm) length and 0.12"-0.13" (0.30 cm-0.33 cm) thickness. The matrix resin was Shell Epon 828, 30 PHR methylene dianaline (from Ciba-Geigy, designated HT-972), and 40 PHR Fortifier I (from Uniroyal Co.). Specimens were cured at 80° C. for 3 hours then at 120° C. for 16 hours. The composites consisted of 10 to 90 vol % of the yarns embedded in a matrix material. Short beam testing was performed in accordance with A.S.T.M. Standard Test Method D2344-26. The short beam strength (SBSS) results and composite properties are presented in the following Table II.

TABLE II

COMPOSITES PROPERTIES

| Example | Yarn | Surface Treatment | Fiber Volume Fraction | SBSS KSI |
|---|---|---|---|---|
| I. Prior Art Yarns | | | | |
| 1 | A | Corona | 0.38 | 3.70 |
| 2 | A | Corona | 0.41 | 3.25 |
| 3 | A | Corona | 0.64 | 3.13 |
| 4 | A | Corona | 0.71 | 2.69 |
| 5 | A | Plasma | 0.45 | 4.20 |
| 6 | A | Plasma | 0.59 | 3.82 |

TABLE II-continued

COMPOSITES PROPERTIES

| Example | Yarn | Surface Treatment | Fiber Volume Fraction | SBSS KSI |
|---|---|---|---|---|
| 7 | A | Plasma | 0.66 | 3.10 |
| 8 | A | Plasma | 0.67 | 3.24 |
| 9 | B | Corona | 0.60 | 3.30 |
| II. Yarns of This Invention | | | | |
| 10 | C | Corona | 0.49 | 4.5 |
| 11 | D | Plasma | 0.22 | 6.53 |
| 12 | D | Plasma | 0.54 | 4.50 |
| 13 | E | Corona | 0.27 | 6.01 |
| 14 | F | Corona | 0.42 | 4.90 |
| 15 | F | Corona | 0.35 | 5.00 |

The short beam strength of the composites of the invention are at least as high as given by the following relationship:

$$SBSS, KSI = 7.32 - 10.73\ V_f + 6.00\ V_f^2 + K_t \quad \text{(Eq. (2))}$$

where:
SBSS is the short beam shear strength, Ksi;
$V_f$ is the fiber volume fraction in the composite;
$K_t$ is a factor related to the surface treatment of the yarn;
$K_t = 0$ for corona treatment; and
$K_t = 0.47$ for plasma treatment.

The experimental short beam shear strength (SBSS) and the short beam shear strength calculated from Eq. (2) for composites containing prior art yarns and for composites containing the yarns of the invention are set forth in the following Table III and Table IV respectively.

TABLE III

Composite Properties Prior Art Yarns

| Ex | Yarn | Surface Treatment | Fiber Volume Fraction | SBSS KSI | SBSS Calc/From Eq. 2 |
|---|---|---|---|---|---|
| 1 | A | Corona | 0.38 | 3.70 | 4.25 |
| 2 | A | Corona | 0.41 | 3.25 | 4.10 |
| 3 | A | Corona | 0.64 | 3.13 | 3.32 |
| 4 | A | Corona | 0.71 | 2.69 | 3.22 |
| 5 | A | Plasma | 0.45 | 4.20 | 4.38 |
| 6 | A | Plasma | 0.59 | 3.82 | 3.89 |
| 7 | A | Plasma | 0.66 | 3.10 | 3.75 |
| 8 | A | Plasma | 0.67 | 3.24 | 3.74 |

TABLE IV

Composite Properties Yarns of the Invention

| Ex | Yarn | Surface Treatment | Fiber Volume Fraction | SBSS KSI | SBSS Calc/From Eq. 2 |
|---|---|---|---|---|---|
| 10 | C | Corona | 0.49 | 4.5 | 3.74 |
| 11 | D | Plasma | 0.22 | 6.53 | 5.77 |
| 12 | D | Plasma | 0.54 | 4.50 | 3.74 |
| 13 | E | Corona | 0.27 | 6.01 | 4.93 |
| 14 | F | Corona | 0.42 | 4.90 | 4.05 |
| 15 | F | Corona | 0.35 | 5.00 | 4.42 |

For the composites prepared from the prior art yarns, the experimentally measured SBSS was less than that calculated from Eq.(2). In contrast, for each of the composites of this invention prepared using the yarns of this invention, the measured SBSS was greater than that calculated from Eq.(2). This result is shown graphically in FIG. 1.

In FIG. 1, the experimental SBSS is plotted versus the SBSS calculated from Eq.(2). For each of the composites of the invention the experimental SBSS lies above the calculated line, whereas for the prior art composites the experimental SBSS lies below the calculated line.

(D) Data Analysis

In order to determine the relationships of SBSS to yarn and treatment parameters, the data of Tables I and II were subjected to statistical analysis by multiple linear regression. The regression equation obtained for SBSS was as follows:

$$SBSS, KSI = 10.11 - 10.73\ V_f + 6.99\ V_f^2 + K_t - 0.048D\ AR \quad \text{(Eq.(1))}$$

Where:
$V_f$ is the fiber volume fraction in the composite;
$K_t$ is a factor related to the surface treatment of the yarn;
$K_t = 0$ for corona treatment;
$K_t = 0.47$ for plasma treatment;
D is the weight average filament diameter in the yarn, micrometers; and
AR is the average filament aspect ratio.

The statistics of the regression were:
F ratio (5,14) - 37.3
Significance level = 99.9 + %
Multiple correlation coefficient = 0.9767
Standard error of the estimate = 0.30Ksi A comparison of the SBSS values set forth in Table II and those calculated from the regression are shown in FIG. 1. The regression shows that increased short beam shear strength was achieved by decreased fiber volume fraction; use of plasma rather than corona treatment of the yarn; use of yarn with smaller weight average filament diameter; and/or use of yarn with lower average filament aspect ratio.

What is claimed is:

1. A composition comprised of one or more layers, at least one of which comprises a network of filaments formed from polyethylene having a molecular weight of at least about 150,000 dispersed in a matrix said filaments having a tensile modulus of a least about 500 grams/denier, an energy-to-break of at least about 20 j/d, a tenacity equal to or greater than about 20 grams/denier, a weight average filament diameter equal to or less than about 37 micrometers, and an average filament aspect ratio equal to or less than about 2.9:1.

2. A composite as recited in claim 1 wherein said filament diameter is from about 20 to about 30 micrometers.

3. A composite as recited in claim 2 wherein said filament diameter is from about 15 to about 20 micrometers.

4. A composite as recited in claim 3 wherein said filament diameter is from about 5 to about 15 micrometers.

5. A composite as recited in claim 4 wherein said filament diameter is from about 5 to about 30 micrometers.

6. A composite as recited in claim 1 wherein said filaments have a tenacity equal to or greater than about 25 g/d, a tensile modulus equal to or greater than about 1000 g/d and an energy-to-break equal to or greater than about 30 j/d.

7. A composite as recited in claim 1 wherein said tenacity is equal to or greater than about 30 g/d, said modulus is equal to or greater than about 1300 g/d and said energy-to-break is equal to or greater than about 4.0 j/d.

8. A composite as recited in claim 1 wherein said filament aspect ratio is from about 2.5:1 to about 2.9:1.

9. A composite as recited in claim 8 wherein said aspect ratio is from about 2:1 to about 2.5:1.

10. A filament as recited in claim 9 wherein said aspect ratio is from about 1:1 to about 2:1.

11. A composite as recited in claim 1 wherein said aspect ratio is from about 1:1 to about 2.9:1.

12. A composite as recited in claim 1 which comprises more than one layer.

13. A composite as recited in claim 12 wherein said network of filaments in each layer comprises a sheet-like filament array in which said filaments are arranged substantially parallel to one another along a common filament direction.

14. A composite as recited in claim 13, wherein said composite comprises more than one layer, with adjacent layers aligned at an angle with respect to the longitudinal axis of the parallel filaments contained in said layers.

15. A composite as recited in claim 12 wherein said network of filaments comprises a non-woven fabric.

16. A composite as recited in claim 12 wherein said network of filaments comprises a woven fabric.

17. A composite as recited in claim 12 wherein the volume fraction of said filaments is at least about 0.4.

18. A composite as recited in claim 1 wherein said matrix material is rigid having a tensile modulus of greater than about 50,000 psi (0.35 Mm Pa kPa) measured at 25° C.

19. A composite as recited in claim 1 wherein said matrix material is selected from the group consisting of thermoplastic resins, thermosetting resins and mixture thereof.

20. A complex composite comprising the composite of claim 1 and at least one rigid impact resistant material laminated thereto.

21. A composite as recited in claim 20 wherein said at least one rigid impact resistant material is arranged as a layer on a major surface of said simple composite.

22. A composite as recited in claim 20 wherein said rigid impact resistant material is ceramic.

23. A composite as recited in claim 20 wherein said rigid impact resistant material is metal.

24. A composite as recited in claim 1 which is a ballistic resistant composite.

25. A composite as recited in claim 20 which is a ballistic resistant composite.

26. A composite as recited in claim 14 wherein said angle is from about 45° to about 90°.

27. A composite as recited in claim 26 wherein said angle is about 90° C.

28. A composite as recited in claim 1 wherein said filament diameter is less than about 30 micrometers.

29. A composite as recited in claim 28 wherein said filament diameter is from about 5 to about 30 micrometers.

30. A composite as recited in claim 1 wherein said aspect ratio is from about 1:1 to about 1.5:1.

31. A composite as recited in claim 1 wherein said molecular weight of filament is equal to or greater than about 500,000.

32. A composite as recited in claim 31 wherein said molecular weight is equal to or greater than about 1,000,000.

33. A composite as recited in claim 1 wherein:
said average filament diameter is from about 5 to about 30 micrometer;
said filament aspect ratio is from about 1:1 to about 2.9:1; and
said matrix is formed from a thermoplastic resin, a thermosetting resin or a mixture thereof and said matrix having a tensile modulus measured at about 23° C. equal to or greater than about 50,000 psi (344.7 MPa).

34. A composite as recited in claim 33 wherein:
said average filament diameter is from about 15 to about 20 micrometer;
said average filament aspect ratio is from about 2.2 to about 2.7; and
said matrix having a tensile modulus measured at about 23° C. equal to or greater than about 100,000 psi (689.4 MPa).

* * * * *